May 22, 1923.
A. FORSMAN
AUTOMATIC BOLTLESS RIM
Filed Dec. 2, 1921
1,456,375
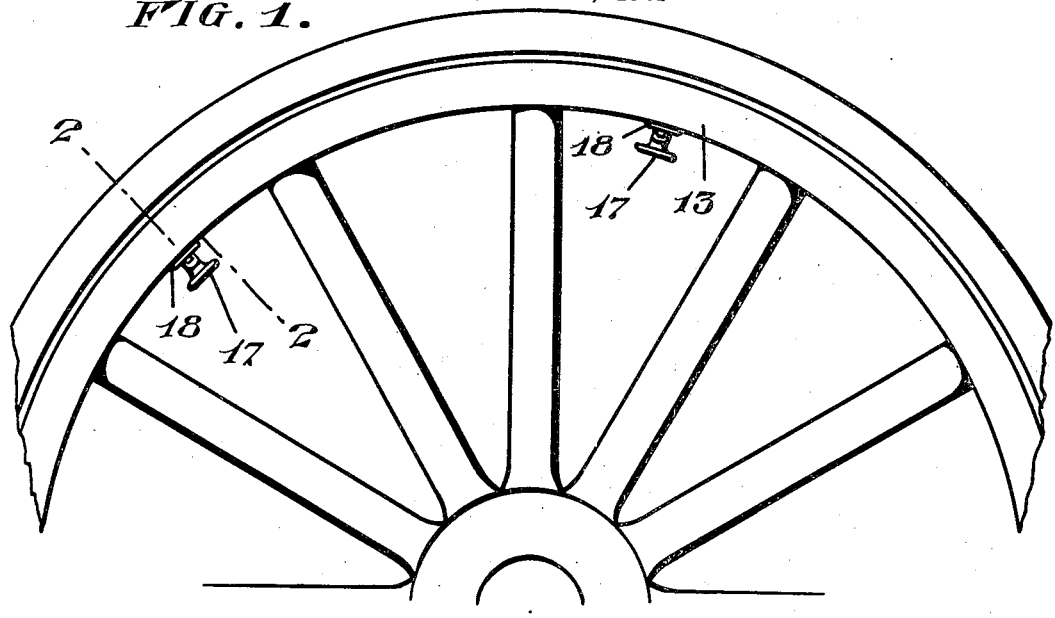
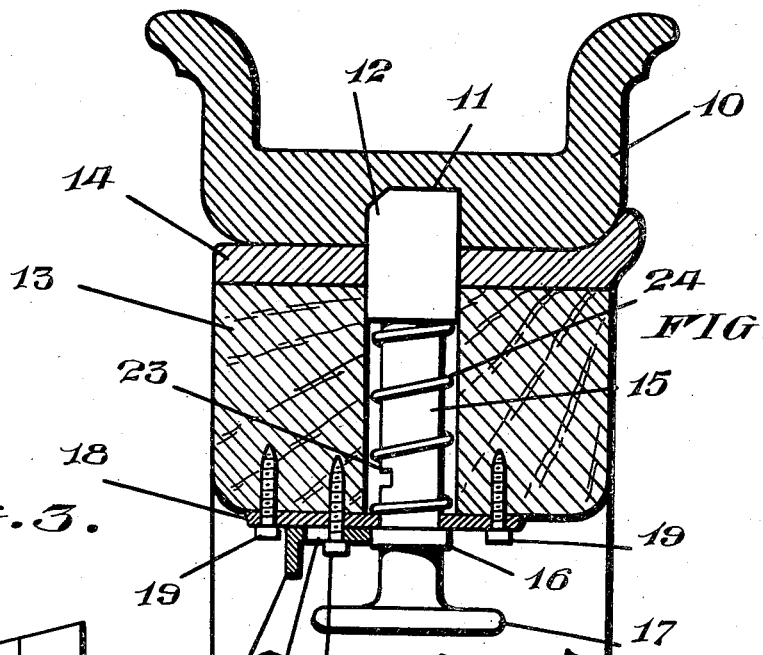
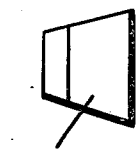
Inventor
ANDREW FORSMAN
By *Beales Park*
Attorney Patented May 22, 1923.

1,456,375

UNITED STATES PATENT OFFICE.

ANDREW FORSMAN, OF IRON RIVER, MICHIGAN, ASSIGNOR OF ONE-HALF TO ARCHIE BEAUCHAMP AND EMIL BEAUCHAMP, ONE-TENTH TO HECTOR McPHEE, AND ONE-TENTH TO EDWARD GREENWOOD, ALL OF IRON COUNTY, MICHIGAN, AND ONE-TWENTIETH TO A. E. STUHT, OF IRON RIVER, MICHIGAN.

AUTOMATIC BOLTLESS RIM.

Application filed December 2, 1921. Serial No. 519,475.

*To all whom it may concern:*

Be it known that I, ANDREW FORSMAN, a citizen of the United States, residing at Iron River, in the county of Iron and State of Michigan, have invented certain new and useful Improvements in Automatic Boltless Rims; and I hereby declare that the following is a full, clear, and exact description thereof, reference being had to the accompanying drawings, which form part of the specification.

My invention relates to automatic boltless rims and particularly adapted for the quick mounting and demounting of automobile rims.

My device is designed to be operated by hand without the use of wrench, screw driver or other tool. The operation is accomplished by pulling upon my device and locking same by a sliding bolt.

In the manufacture of my lug I prefer to form it so that the cross section thereof will be substantially as shown in Fig. 3, this construction having been found to be stronger and to wear longer than the old round lug now in use.

Referring to the drawings:—Fig. 1 denotes a portion of a hub, spokes, felly, and rim showing my device in place. Fig. 2 is a cross section on the line 2—2 of Fig. 1. Fig. 3 denotes an end view of my lug.

Referring more particularly to the drawings:—10 denotes a demountable rim of conventional type having formed therein a socket 11 of substantially triangular section for the reception of a lug 12. The main wooden felly 13 has mounted thereon a metal rim 14. It will be seen from the drawings that my lug 12 has a round shank 15 a shoulder 16 and a hand grip or knob 17. A plate 18 having therein a hole for the passage of said shank 15 is attached to said wooden felly 13 by screws 19. A locking slide plate 20 having a guide slot 21 is held in slidable relation to said shank 15 by a screw 22 and said sliding plate 20 is adapted to slide into slot 23 when it is desired to hold the lug 12 out of engagement with the demountable rim.

It will be noted that I prefer to bevel a portion of my lug so that it may more readily find its seat in socket 11.

It is also apparent that a hole similar to the cross section of my lug 12 is formed in the metal rim 14 to prevent the turning of said lug.

Further it will be seen that I may attach a spring to sliding plate 20 so that said spring will be normally under tension and will force said plate to register with the slot 23 when the lug 12 is disengaged.

It will be seen that my automatic boltless rim or rim lock provdes a long felt need of a quick detachment for a demountable rim comprising simplicity and durability.

Claims—

1. Rim locks of the class described comprising a felly; a metal rim mounted thereon; a demountable rim slidable on said metal rim; lug members comprising an end portion adapted to enter sockets in said demountable rim; shank portions having slots formed therein to receive locking slides adapted to hold said lugs out of engagement with said demountable rim and hand grips for the disengagement of said lugs from said sockets, said lugs being raidally slidable in the felly and said rims and springs normally holding said lugs in said sockets.

2. In a rim lock the combination of a radial lug for a demountable rim comprising an end member adapted to engage said rim and a shank member attached to said end member having a slot therein; a spring adapted to hold said end member in engagement with said rim and a sliding member adapted to engage the slot in said shank when said lug is retracted from said rim.

In testimony that I claim the foregoing as my own, I affix my signature.

ANDREW FORSMAN.